United States Patent
Beer

(10) Patent No.: US 9,522,686 B2
(45) Date of Patent: Dec. 20, 2016

(54) CONTROL SYSTEM FOR RAIL-BASED AUTOMATED TRANSPORT VEHICLES AND A PROCESS FOR ITS OPERATION

(71) Applicant: SERVIS Intralogistics GmbH, Dornbirn (AT)

(72) Inventor: Christian Beer, Schwarzach (AT)

(73) Assignee: SERVIS Intralogistics GmbH, Dornbirn (AT)

( * ) Notice: Subject to any disclaimer, the term of this patent is extended or adjusted under 35 U.S.C. 154(b) by 0 days.

(21) Appl. No.: 14/315,871

(22) Filed: Jun. 26, 2014

(65) Prior Publication Data
US 2015/0025714 A1   Jan. 22, 2015

(30) Foreign Application Priority Data

Jun. 28, 2013   (DE) .................. 10 2013 010 787

(51) Int. Cl.
| | |
|---|---|
| B61L 27/00 | (2006.01) |
| G05B 19/418 | (2006.01) |
| G05D 1/02 | (2006.01) |
| G06K 7/10 | (2006.01) |
| B61L 3/12 | (2006.01) |
| B61L 25/02 | (2006.01) |
| B61L 27/04 | (2006.01) |

(52) U.S. Cl.
CPC ............. *B61L 27/00* (2013.01); *B61L 3/125* (2013.01); *B61L 25/025* (2013.01); *B61L 27/04* (2013.01); *G05B 19/4189* (2013.01); *G05D 1/0287* (2013.01); *G06K 7/10366* (2013.01); *Y02P 90/28* (2015.11)

(58) Field of Classification Search
CPC ............ G05D 1/00; B61L 27/00; B61L 27/04; G06K 7/10366
See application file for complete search history.

(56) References Cited

U.S. PATENT DOCUMENTS 5,598,783 A * 2/1997 Lund .................. B61B 13/00
                                                                104/124
5,625,559 A * 4/1997 Egawa ............. G05B 19/41895
                                                                701/117

(Continued)

FOREIGN PATENT DOCUMENTS

| CN | 102890510 | 1/2013 |
|---|---|---|
| DE | 694 15 067 T2 | 8/1999 |

(Continued)

OTHER PUBLICATIONS

Office Action dated Jun. 27, 2014 in corresponding German Application No. 10 2013 010 787.3.

(Continued)

*Primary Examiner* — Jelani Smith
(74) *Attorney, Agent, or Firm* — Faegre Baker Daniels LLP

(57) ABSTRACT

A process for the control of movement of rail-based automated transport vehicles (2a, 2b) in a multi-branch rail system (1) that contains in particular switches (4), lifts (10, 11) and other integrated rail-based units, including stations for loading and unloading, with a depiction of rail system (1) in the control system of the automated transport vehicle (2a, 2b) with all integrated rail-based units (4; 10, 11; 13-16; 20, 21, 33) by means of nodes (7-9; 22-25) and edges (26-31) as defined in graph theory.

20 Claims, 3 Drawing Sheets

(56) References Cited

U.S. PATENT DOCUMENTS

Figure 1:
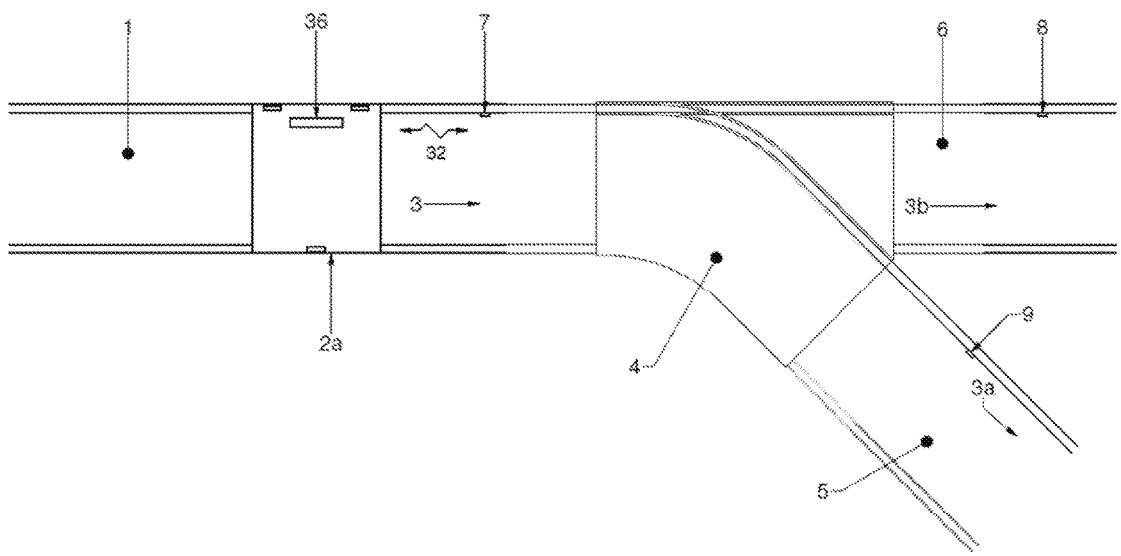

| | | | |
|---|---|---|---|
| 2005/0060069 A1* | 3/2005 | Breed | B60N 2/2863 |
| | | | 701/408 |
| 2005/0159854 A1 | 7/2005 | Hori et al. | |
| 2011/0118869 A1* | 5/2011 | Smith | G05D 1/0219 |
| | | | 700/218 |
| 2011/0184596 A1* | 7/2011 | Andreasson | B61L 23/34 |
| | | | 701/19 |
| 2013/0049977 A1 | 2/2013 | Finkbeiner | |
| 2014/0361875 A1* | 12/2014 | O'Hagan | G06K 7/10227 |
| | | | 340/8.1 |

FOREIGN PATENT DOCUMENTS

| | | |
|---|---|---|
| DE | 198 42 752 A1 | 4/2000 |
| EP | 0 618 523 | 4/1994 |
| EP | 1 703 351 A2 | 9/2006 |
| EP | 2 527 274 | 5/2012 |
| WO | 2012/141601 | 10/2012 |

OTHER PUBLICATIONS

EP Search Report dated Oct. 19, 2015 in corresponding Application No. 14 00 2200 and English language translation of the same.

\* cited by examiner

CONTROL SYSTEM FOR RAIL-BASED AUTOMATED TRANSPORT VEHICLES AND A PROCESS FOR ITS OPERATION

CROSS-REFERENCE TO RELATED APPLICATION

The present application claims priority to DE 10 2013 010 787.3, filed Jun. 28, 2013, the entire disclosure of which is hereby expressly incorporated herein by reference.

The invention concerns a control system for rail-based automated transport vehicles and a process for its operation as described in the preamble of Patent Claim 1.

EP 1 703 351 A2 describes a system known as a "Manhattan System" for a control system for rail-based automated transport vehicles with a multi-branch rail system. This control system consists of a designation of a number of one-way streets, intersections, and traffic rules that preclude a collision of multiple automated transport vehicles operating in a rail system. The present invention refers to the information contained in that document, and such information is an integral component of this description.

The same applies to the object of DE 198 42 752 B4, which describes a transfer system comparable to the rail system of the invention.

The designation as "Manhattan System" was derived from the street system in Manhattan in the city of New York, where traffic rules are imposed by a strict road management system; for example, that traffic may drive on roads leading from West to East only in that direction, whereas traffic on roads leading in the opposite direction may drive only in the opposite direction.

This set of traffic rules assures collision-free travel for a number of rail automated transport vehicles in a rail system.

However, the known system has the disadvantage that it is not feasible to specify multiple levels of the rail system. Thus, it is a two-dimensional system operating on a single horizontal plane, which imposes restrictions.

Thus, the present invention is designed to provide a control system for automated transport vehicles running on a multi-branch rail system operating on multiple horizontal planes.

Emphasis shall be placed on the speedy derivation of control instructions, on minimal computation effort, and on an independent derivation process of the intended travel route for each automated transport vehicle with advance planning for multiple intersections and planes.

The Manhattan System limits the derivation for multiple paths to the application of traffic rules, which is an inflexible process. Thus, if the rules for a particular rail segment are changed, the entire software has to be modified.

The present system has the advantage that an automated transport vehicle with a built-in control system can determine its future routing via a plurality of intersections and switches by use of a virtual evaluation system.

It is an essential characteristic of the invention that the rail system is depicted in the control system of the automated transport vehicle by means of nodes and edges as defined in graph theory. This depiction presents a directed graph. A complete and multi-branch rail system with its features, work stations and storage sites is thus unambiguously described by a list of nodes and their associated edge listings.

This provides the advantage that each automated transport vehicle can determine its current destination in advance prior to initiating movement, where the route is derived by a virtual evaluation system that is comparable to a benefit-cost analysis.

The various lines to be traveled by the automated transport vehicle are linked to virtual costs. Costs of reaching a distant destination from the current location are increased by increasing the distance to be traveled by the vehicle and by increasing the number of planes to be traversed.

Graph theory defines a graph as a number of nodes (also called vertices) with a number of edges. An edge here includes exactly two nodes. If the number of nodes is finite, the graph is called a finite graph; the alternative is an infinite graph. If the edges are described as pairs of specific nodes, the graph is described as a directed graph. In that instance, a distinction is made between edge (a, b)—the edge from node a to node b—and edge (b, a)—the edge from node b to node a.

Nodes and edges may also be designated by color (expressed formally in natural numbers) or weights (i.e. rational or real numbers). Such graphs are designated as node or edge colored graphs or node or edge weighted graphs.

Graphs may have various properties. For example, a graph may be contiguous, bipartite, planar, Eulerian or Hamiltonian. Queries may be entered for the existence of specific separate graph segments or for certain parameters, such as the number of nodes, the number of edges, the minimum degree, the maximum degree, the width at the narrowest point, the diameter, the number of associated nodes, the number of associated edges, the chromatic parameter, the stability parameter or the number of groups.

The various properties may be correlated. Graph theory is designed to examine these relationships. For example, the number of associated nodes will never exceed the number of associated edges, which in turn will never exceed the minimum degree of the graph in question. For level graphs, the number of colors will always be less than five. This is known as the Four Color Theorem.

Some of the graph properties listed can be determined algorithmically quite quickly, such as that the effort will not expand faster than the square of the size of the graphs.

The following definitions apply to a use of graph theory to the characteristics of the invention:

Route: Several edges yield a route

Nodes: Nodes may be embodied as lifts, switches, RFID tags or a segment

Edges: Edges are connections between two nodes

Location: For example, location may designate a storage location in a warehouse

Nodes are thus positions where an action is required. Normally, such positions will include an RFID tag (such as registration for a lift, a loading station and the like). But it is also possible to set virtual nodes (without an RFID tag).

Node IDs 1 and 2 are defined for the automated transport vehicle itself, and node IDs 1 and 2 are used for internal processes, such as the control of the lift supported by the vehicle, for a loading device or for other items on the vehicle designed to load or unload the vehicle, for example.

Virtual nodes are nodes without an associated RFID tag on the track.

A. Virtual nodes are used for:

a.) Save real (physical) RFID tags:

In order to keep matters simple, real RFID tags will be used only once on the loading platform of a lift. Thus, each level has then one virtual node with one virtual RFID tag in order to indicate entry into a new storage system.

b.) Positions in close proximity:

RFID tags operating with radio transmissions need to be separated by a certain distance in order to send an unambiguous signal to identify the sending tag in a line of tags in close proximity. It is feasible to set a single RFID tag and to include a second node as a virtual node. That approach precludes crossing signals from RFID tags located in close proximity.

c.) Dead ends:

The dead end of a line in a warehouse will be designated by a virtual node. This permits the identification of an edge at the end of a storage range without using an RFID tag and likewise to specify a certain definition of the length of the storage range.

B. Information of a node:

a.) Unambiguous node ID (size 1, less than 65535)

b.) Node type: Each node may be of several types simultaneously (such as lift, registration for lift, stop at lift and the like)

c.) RFID number of the associated RFID tag (virtual nodes have the RFID number 0)

C. Edges a.) Edges define the path from one position to the next.

b.) Each edge links two nodes and signifies an unambiguous direction from one node to the next.

C1. Edges in a storage site within a warehouse:

Edges depicting a path in a warehouse will store the number of storage sites to the right and to the left of the path (seen from the main direction of travel of the automated transport vehicle). It is important in the case of a dead-end path or a path that can be accessed in two directions that the numbers be stored for only one of the edges (preferably for the edge pointing in the direction of travel).

C2. Length of the edge:

This is the distance of the path between two nodes (larger than zero and less than 65534 cm).

D. Costs:

The costs of a virtual evaluation system may range from 0 to 255, where 0 implies that the path is deactivated.

The longer the path, the higher the costs implied by taking this path.

Similarly, costs for the paths are allocated to each path based on the layout in the system.

For example, a high cost accrues for travel from an upper or lower level in the storage system to a different level. The costs are thus also correlated with the travel time required between the start and the destination as well as with the changes in levels en route.

Thus, a change in levels will occasion higher costs than a direct path that does not require a change in levels.

Cost management is currently imposed only for the lift and for the control of movement towards a lift. However, the invention is not limited by that facet. The invention may distribute and assign costs for any edge in order to derive a certain valuation for a specific path.

Rather than the term "costs," other evaluation terms may be used as well, such as "points" or other virtual parameters that can be valued in a decimal system.

The present invention has the advantage that the automated transport vehicle will note its current location for any location of the vehicle via a NFC connection (all RFID tags of the invention operate only in the NFC field). The transmission is handled by passive HF RFID tags as described in ISO 14443 or ISO 15693).

The NFC technology operates at a frequency of 13.56 MHz and offers a data transmission rate of no more than 424 kBit/s for a transmission range of only ten centimeters. The communication between NFC devices may be either active-passive or active-active (Peer-To-Peer) unlike conventional wireless transmissions on this frequency (only active-passive). Thus NFC provides a linkage to the RFID world.

NFC communications achieve a range of roughly 10 to 30 cm, which requires the automated transport vehicle to approach closely to any RFID tag along the path and to initiate contact with the RFID tag in order to compute its travel route.

The data exchange with the RFID tag via the NFC protocol then indicates the current position of the vehicle.

The vehicle then uses a wireless protocol, such as the ZigBee standard, to transmit a signal to an external control unit regarding its present position and also queries simultaneously for any pending orders. ZigBee is an industry standard for wireless networks. The PHY and MAC layers are based on IEEE 802.15.4 which facilitates transmissions between household appliances, sensors and the like over short distances (10 to 100 meters).

This wireless communication connection then transmits transport and movement orders to the automated transport vehicle.

These transport and movement orders also specify the destination of movement.

The computer of the automated transport vehicle then computes the currently optimal path towards that destination. The edges are read into the computer of the automated transport vehicle for a subsequent evaluation of the path using all edges, specifically based on the aggregate costs.

As a result, the automated transport vehicle will have a number of options to reach the intended destination.

It is advantageous that the automated transport vehicle chooses the route of lowest costs. This also implies that a change of levels will be avoided to the extent possible, that the route is chosen to avoid blocked pathways, and that needed detours will be considered. The (path-specific) costs are determined in this manner.

The system is a vector-based navigation system, where each RFID-based node has a unique geographic position. The information consists of at least one edge, a corner and information regarding the level.

The layout of the entire rail system is stored in each case in the computer of the automated transport vehicle as a map file describing a plurality of nodes and edges. Thus, the computer contains all information needed to reach any given point in the multi-branch rail system.

This is similar to a vector graphic system as provided in any motor vehicle and in the navigation system in that motor vehicle, but the system of the invention also needs to track a plurality of levels and the costs associated with all edges as a function of the level and the distance from the current position.

This is not a geo-referenced GPS system as is required for a conventional navigation system, but there are only RFID nodes in key positions of the rail system (switches, entrance, exit, lift, exit from the warehouse, designation of the storage level) that communicate over short distances (NFC) with the automated transport vehicle. This avoids the undesirable interference of multiple signals for adjacent RFID nodes. Thus, such RFID signals may be free of interference despite close proximity.

Furthermore, the invention has the advantage that virtual RFID nodes may be defined. This has the added advantage that a physical tag is not required and that a virtual (added) RFID tag is merely added to a physical RFID tag, which designates, for example, the distance from the virtual node to the real RFID tag, the level and other path-specific criteria.

Thus, for any physical RFID tag, a plurality of virtual RFID tags may be defined for the vicinity of this real RFID tag.

This has the advantage that virtual RFID tags may be positioned in close proximity to an RFID tag without encountering undesirable interference with physical RFID tags, as would be the case for physical RFID tags in close proximity.

As a result, the control system incorporated into the automated transport vehicle notes the current location of the vehicle in the multi-branch rail system by accepting the unambiguous identification of the closest RFID tags and comparing it to the multi-branch rail system information in memory to confirm the current location.

Based on this information on the current position, the evaluation software then decides on the optimal path to the destination.

It is important that no additional data need to be stored on the RFID tag, except for the unique ID number, which thus minimizes the computational effort.

However, the invention is not limited in this regard, because the invention could also designate that an RFID tag sends not only its unique position to the automated transport vehicle, but also additional data, such as movement instructions, transport instructions, cost data and the like.

The inventive object of the present invention derives not only from the separate patent claims, but also from the combination of the various patent claims.

All of the information and characteristics shown in the documentation, including the summary, and including specifically the spatial layout shown in the figures, are claimed as essential to the invention to the extent that they are novel individually or in combination relative to the state of the art.

The invention will be described in more detail in the following by reference to the figures, which show merely one embodiment. Essential characteristics and advantages of the invention are presented in the figures and their descriptions.

They show:

FIG. 1: A schematic top view of a rail system with an automated transport vehicle operating in that rail system.

Figure 2:
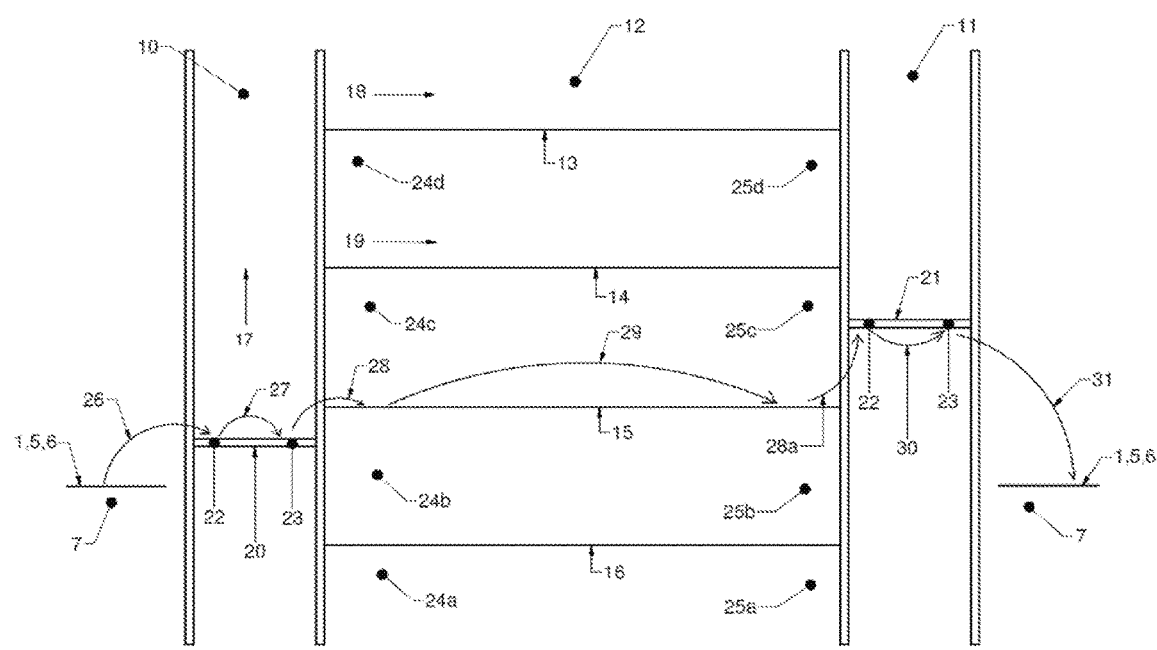

FIG. 2: A frontal view of a multi-branch rail system with a storage system containing four storage levels above each other, where lifts are included at the entrances and exits to such storage levels.

Figure 3:
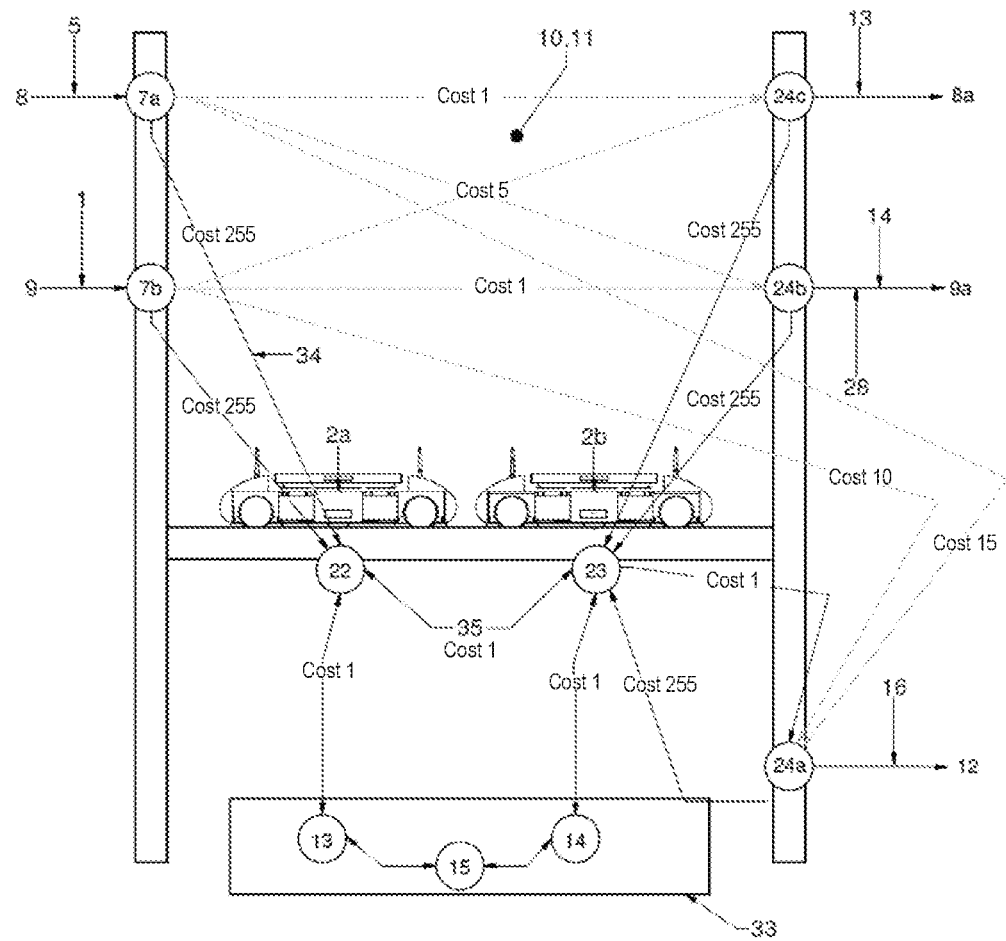

FIG. 3: A schematic of the frontal view of a lift with two automated transport vehicles on a lift platform and edges marked with directional arrows and associated virtual costs.

FIG. 1 shows a schematic top view of a multi-branch rail system 1 on which automated transport vehicle 2a moves in the direction depicted by arrow 3.

The vehicle enters switch 4. Switch 4 branches into two rails 5, 6.

Automated transport vehicle 2 contains an RFID reader 36 that uses NFC transmission 32 to make contact with RFID node 7, which is the closest node in the direction of travel on rail system 1.

RFID node 7 sends its unique ID and a ping via the NFC connection. The ID is entered into the control system of the automated transport vehicle and is compared there to the information about the rail system, such that the ID of RFID node 7 will yield the current location of the automated transport vehicle 2a in rail system 1 with a precision of 20 cm.

The exits from switch 4 include the additional RFID nodes 8 and 9. As automated transport vehicle 2a approaches one of these nodes 8, 9, a new NFC connection is made between reader 36 in automated transport vehicle 2a and the respective node 8, 9, and the now current position is noted from the evaluation of the ID of this RFID node 8, 9.

Automated transport vehicle 2a can then move in the direction of arrow 3a or 3b along the corresponding rail path 5 or 6.

FIG. 2 shows a frontal view of the multi-branch rail system. The view is simplified to show that the entrance to multi-branch storage system 12 includes two vertical lifts 10, 11.

Each lift 10 supports at least one lift platform 20, 21, with which one or more automated transport vehicles 2a, 2b may be raised or lowered in order to move in the direction of arrow 17 or in the opposite direction from the lower level of rail system 1, 5, 6 to a higher storage level 13-16 of storage system 12.

The paths between the RFID nodes of the entire storage system 12 are defined by edges 26-31. Each edge has a determinate length with associated virtual costs.

The concept of virtual costs was discussed in the general description.

For example, a first edge 26 or optionally a second edge 27 extends from RFID node 7 to RFID node 22 or 23 on lift platform 20.

In the embodiment depicted here, lift platform 20 supports two RFID nodes 22, 23, because lift platform 20 is intended to transport two separate automated transport vehicles 2a, 2b, as shown in FIG. 3, where each automated transport vehicle follows its own path and transport orders.

By analogy, other edges are formed by the distance from RFID nodes 22, 23 to RFID nodes 24a, 24b, 24c and 24d on the storage level sides.

Additional edges are formed by edges 29 on storage levels 13-16. Other edges are formed by edges 28a and edges 30 and 31, which are defined on the exit side of storage system 12 in the direction of lift 11 at the exit.

Thus, each automated transport vehicle may move independently of any other automated transport vehicle in each case on one storage level 13-16 in the direction of arrows 18 or 19.

The distances between RFID nodes 22-25 are defined by the corresponding edges, where each edge has an associated virtual cost.

FIG. 3 shows an example of the computation of the cost of movement for two independent automated transport vehicles 2a, 2b positioned on lift platform 20 of lift 10, 11.

For simplicity, the RFID nodes are identified with single digit numbers in a circle. Thus, these numbers are not reference numbers, but node names.

For example, if automated transport vehicle 2a is in position on lift platform 20 and initiates an NFC connection with node No. 5 (RFID node 22), the distances to any number of nodes along a path will be computed.

For example, if automated transport vehicle 2a moves from node No. 1 to node No. 3 via rail 5, the vehicle will receive a first path instruction from node No. 3 in the form of edge 34 with costs of 255.

Thus, edge 34 extends from node No. 3 to node No. 5.

If the automated transport vehicle 2a is intended to move from node No. 3 via node No. 5 to node No. 6 (node No. 6 is RFID node 23), additional costs will be incurred, but at a low rate of decimal 1.

In contrast, if automated transport vehicle 2a is intended to move directly from node No. 3 and node No. 27 (RFID node 24c) straight-through on the same level of raised lift platform 20, this edge would also have a cost of only 1.

These costs are so low, because no movement to a different level is required.

Thus, it is feasible to move from node No. 1 via node No. 3 and node No. 7 to node No. 10 at minimal cost given a direct movement via the edges along the path. This path will then be the preferred routing for the automated transport vehicle.

It is thus feasible to specify the costs to be incurred by movement of automated transport vehicle 2a, 2b from node No. 5 or node No. 6 to any distant node by tracing the arrows and the associated costs for the intervening edges.

FIG. 3 also shows that the lift may also include a processing unit 33 and that only minimal costs of 1 would be incurred, if the route were to lead from lift 20 to nodes No. 13, 14 or 15.

However, if the route were to require movement to node No. 9, which forms the discharge of lift 10, 11, high costs of 255 would be incurred, because it involves a change in levels to storage level 16, which forms the lowest level of storage system 12.

LEGEND ON FIGURES 1 rail system
2a Automated transport vehicle
2b Automated transport vehicle
3 Direction of arrow
4 Switch
5 Rail
6 Rail
7 RFID node
8 RFID node
9 RFID node
10 Lift
11 Lift
12 Storage system
13 Storage level
14 Storage level
15 Storage level
16 Storage level
17 Direction of arrow
18 Direction of arrow
19 Direction of arrow
20 Lift platform
21 Lift platform
22 RFID node
23 RFID node
24 RFID node a, b, c, d
25 RFID node a, b, c, d
26 Edge
27 Edge
28 Edge
29 Edge
30 Edge
31 Edge
32 NFC connection (RFID)
33 Processing unit
34 Edge
35 Edge
36 RFID reader

The invention claimed is:

1. A method for controlling movement of rail-based automated transport vehicles in a multi-branch rail system the method comprising:
storing a representation of the multi-branch rail system in a control system of an automated transport vehicle, the representation of the rail- based system including switches, lifts and integrated rail-based units represented by nodes and edges as defined in graph theory;
determining current positions of the rail-based automated transport vehicles;
determining a destination of the automated transport vehicle;
determining path-specific costs for a plurality of paths along the multi-branch rail system between a current position of the automated transport vehicle and the destination using costs associated with the nodes and the edges, wherein a cost associated with a node is a function of a storage level of the node, wherein a cost associated with an edge is a function of a storage level of the edge and wherein a highest cost is assigned to a node that requires changing storage levels for the automated transport vehicle and
selecting a path of the plurality of paths that has the lowest non-zero cost to control movement of the rail-based automated transport vehicle.

2. The method of claim 1, associating each node with an RFID tag.

3. The method of claim 2, wherein the RFID tag is either a physical RFID tag or a virtual RFID tag with no physical properties.

4. The method of claim 2, wherein the RFID tag includes information about a geographic location of the rail-based unit and a level of the rail-based unit.

5. The method of claim 1, wherein the edges form connections between nodes.

6. The method of claim 1 wherein determining path-specific costs for a plurality of paths along the multi-branch rail system comprises determining path-specific costs for all the plurality of paths along the multi-branch rail system between a current position of the automated transport vehicle and the destination.

7. The method of claim 1,
wherein determining a current position of the automated transport vehicle comprises:
initiating communication with an RFID tag proximate to the current position of the automated transport vehicle;
determining the current position by a data exchange with the RFID tag using an NFC protocol; and
sending a signal, via a wireless communication, to an external control unit to indicate the current position; and
wherein determining a destination of the automated transport vehicle comprises:
querying the external control unit to determine whether there are any current orders for movement of the automated transport vehicle; and
receiving an order, via the wireless communication with the external control unit, for the movement of the automated transport vehicle to the destination.

8. The method of claim 1, wherein a cost associated with an edge is a function of a length of the edge.

9. A control system to control movement of rail-based automated transport vehicles in a multi-branch rail system, the system comprising: memory storing a representation of the multi-branch rail system including switches, lifts and integrated rail-based units represented by nodes and edges as defined in graph theory;
a processing device configured to:
receive current positions of the rail-based automated transport vehicles;
receive a destination of an automated transport vehicle of the rail-based automated transport vehicles;

determine path-specific costs for a plurality of paths along the multi-branch rail system between a current position of the automated transport vehicle and the destination using costs associated with the nodes and the edges, wherein a cost associated with a node is a function of a storage level of the node, wherein a cost associated with an edge is a function of a storage level of the edge and wherein a highest cost is assigned to a node that requires changing storage levels for the automated transport vehicle; and select a path of the plurality of paths that has the lowest non-zero cost to control movement of the rail-based automated transport vehicle.

10. The control system of claim 9, wherein each rail-based unit of the rail system is equipped with an RFID tag that communicates with an RFID reader in the automated transport vehicle via an NFC connection.

11. The control system of claim 10, wherein the RFID tag includes information about a geographic location of the rail-based unit and a level of the rail-based unit.

12. The control system of claim 9, wherein the memory and processing device are included in a computer of the automated transport vehicle.

13. The control system of claim 12,
wherein to determine a current position of the rail-based automated transport vehicles, the processing device is configured to:
initiate communication with an RFID tag proximate to the current position of the automated transport vehicle;
determine the current position by a data exchange with the RFID tag using an NFC protocol; and
send a signal, via a wireless communication, to an external control unit to indicate the current position;
wherein to determine a destination of the automated transport vehicle, the processing device is configured to:
query the external control unit to determine whether there are any current orders for movement for the vehicle; and
receive an order, via a wireless communication with the external control unit, for the movement of the automated transport vehicle to the destination.

14. The control system of claim 9, wherein the edges form connections between nodes.

15. The control system of claim 9, wherein to determine path-specific costs for a plurality of paths along the multi-branch rail system, the processing device is configured to determine path-specific for all the plurality of paths along the multi-branch rail system between a current position of the automated transport vehicle and the destination.

16. The control system of claim 15, wherein a cost associated with an edge is a function of a length of the edge.

17. A method for controlling movement of rail-based automated transport vehicles in a multi-branch rail system, the method comprising:
determining a representation of the multi-branch rail system using graph theory, wherein the representation of the rail-based system includes switches, lifts and integrated rail-based units represented by nodes and edges;
assigning costs to the nodes and edges, wherein a cost associated with a node is a function of a level of the node, wherein a cost associated with an edge is a function of a level of the edge and wherein a highest cost is assigned to a node that requires changing levels for the automated transport vehicle; and
storing the representation of the multi-branch rail system and the assigned costs in a control system to control movement of the rail-based automated transport vehicle.

18. The method of claim 17, further comprising controlling movements of the rail-based automated transport vehicles using the representation of the multi-branch rail system and the assigned costs.

19. The method of claim 18, wherein controlling movement of the rail-based automated transport vehicles comprises:
determining current positions of the rail-based automated transport vehicles;
receiving a destination of at least one automated transport vehicle of the rail-based automated transport vehicles; and
determining a path along the multi-branch rail system for the automated transport vehicle using the stored representation of the rail system, the assigned costs, the current positons and the destination.

20. The method of claim 19, wherein determining a path along the multi-branch rail system comprises:
determining path-specific costs for a plurality of paths along the multi-branch rail system between a current position of the automated transport vehicle and the destination using the costs associated with the nodes and the edges; and
selecting a path of the plurality of paths that has the lowest non-zero cost.

* * * * *